United States Patent [19]

Moore

[11] 3,873,733

[45] Mar. 25, 1975

[54] METHOD OF PRODUCING A PELLETED SLOW RELEASE NPN FEED FOR RUMINANTS

[75] Inventor: William Percy Moore, Chester, Va.

[73] Assignee: Allied Chemical Corporation, New York, N.Y.

[22] Filed: Aug. 2, 1973

[21] Appl. No.: 385,215

Related U.S. Application Data

[63] Continuation of Ser. No. 234,415, March 13, 1972, abandoned.

[52] U.S. Cl. ............... 426/69, 426/210, 426/302, 426/373, 426/374, 71/11, 71/29, 426/807
[51] Int. Cl. .................... A23k 1/14, A23k 1/22
[58] Field of Search .......... 426/69, 74, 2, 807, 364, 426/512, 213, 373, 210, 374, 456, 377, 103, 302; 71/11, 25, 26, 28, 29

[56] References Cited
UNITED STATES PATENTS

| 2,714,553 | 8/1955 | Bibb | 71/23 |
| 2,861,886 | 11/1958 | Colby et al. | 99/2 |
| 3,050,383 | 8/1962 | Wilson | 71/11 |
| 3,073,693 | 1/1963 | Nielsson et al. | 71/13 |
| 3,490,912 | 1/1970 | Freese | 99/6 |
| 3,512,986 | 5/1970 | Snyder et al. | 426/2 |
| 3,573,924 | 4/1971 | Zarrow | 99/6 |
| 3,655,395 | 4/1972 | Karnemant | 71/28 |
| 3,677,767 | 7/1972 | McNeff | 99/6 |
| 3,713,800 | 1/1973 | Karnemant | 71/28 |

FOREIGN PATENTS OR APPLICATIONS

| 1,104,934 | 3/1968 | United Kingdom | 99/2 ND |
| 1,002,198 | 8/1965 | United Kingdom | 426/69 |

Primary Examiner—A. Louis Monacell
Assistant Examiner—Curtis P. Ribando
Attorney, Agent, or Firm—Fred L. Kelly

[57] ABSTRACT

Readily available, solid carbohydrate materials comprising water-insoluble polysaccharides are converted into slow-release nitrogen products valuable as a protein substitute in ruminant feeding and as a slow-release fertilizer for growing plants. The slow-release properties are achieved by acid catalyzed reaction of an amide such as urea or biuret with partially degraded polysaccharides and by agglomeration of this combination into particles having substantial physical integrity. Improved agglomeration is achieved by pelleting the amide-polysaccharide intermediate product in the presence of a minor amount of a urea-formaldehyde polymer.

3 Claims, No Drawings

METHOD OF PRODUCING A PELLETED SLOW RELEASE NPN FEED FOR RUMINANTS

CROSS REFERENCES TO RELATES APPLICATIONS

This is a continuation of application Ser. No. 234,415, filed Mar. 13, 1972, now abandoned.

This application is related to U.S. application Ser. No. 163,305, filed July 16, 1971.

BACKGROUND OF THE INVENTION

Farm animals are commonly grouped into two classifications: ruminant and monogastric. Ruminant animals, which include cattle and sheep, have a complex stomach of several compartments. The first stomach, lying next to the reticulum, is known as the rumen.

It is well known that ruminant animals have the unique ability of utilizing nonprotein nitrogenous compounds such as urea, biuret, formamide and acetamide, as well as phosphorus and sulfur compounds such as ammonium phosphates and ammonium sulfate. This is accomplished by the symbiotic relationship between microorganisms that multiply in the rumen and reticulum of the ruminant animals, which actually utilize the compounds and convert them into organismal material that can in turn be digested and absorbed by the ruminant.

As a nonproteinaceous source of nitrogen, urea is particularly attractive in feeding ruminants because it represents a concentrated and economical form of nitrogen. Pure urea contains about 46.5 percent nitrogen, but the amount that can safely be incorporated in ruminant feeds is limited by the fact that it possesses a definite toxicity limit toward ruminants. Accordingly, the art has long sought a practical and economical way of utilizing urea in animal feeds while at the same time minimizing its toxic propensities.

U.S. Pat. No. 3,490,912 discloses admixing a solution of urea with a solid absorbent feedstuff, drying the mixture, and pelleting the dried urea-containing feedstuff. Unfortunately, the resulting pellets have relatively poor crushing strength. Thus, there is a present need for improvement in such formulations. Also, as presently utilized in animal feeds, urea must be supplied in limited amounts, for if too much is included in the feed, or if it is not well blended with the other ingredients, digestive or other disturbances may result which may even be severe enough to cause death.

SUMMARY OF THE INVENTION

The chief object of this invention is to provide a new controlled release nitrogen particulate product suitable for safe use in either animal feeds or plant foods, containing primarily adducts of natural polysaccharides and amides plus minor amounts of urea-formaldehyde polymers to form physically strong particles.

Another object of this invention is to provide a process for producing a novel composition which delivers synthetic nitrogen for safe and efficient use in agricultural environments without addition of undesirable materials to the environment. This composition is equally effective for delivery of synthetic nitrogen for plant foods or for safe delivery of synthetic nitrogen as a protein substitute in ruminant feeds.

Still another object of the invention is to provide a process for converting waste or by-product materials comprising polysaccharides into a valuable slow-release nitrogen composition useful in agriculture, thereby improving the ecology with respect to waste disposal.

In accordance with the invention, I provide a process for preparing a pelleted slow-release nitrogen composition suitable for use as a protein substitute in ruminant feeding and as a fertilizer for growing plants, said process comprising the following steps:

a. impregnating a solid carbohydrate material comprising water-insoluble polysaccharides with an aqueous solution of an amide selected from the group consisting of urea, biuret, formamide, and acetamide, and an acid catalyst selected from the group consisting of sulfuric acid, phosphoric acid and acidic ammonium salts of sulfuric acid and phosphoric acid, thereby providing an acid catalyst for hydrolysis of the polysaccharides to form carbonyl groups reactive to urea;

b. drying and reacting said impregnated solid material at a temperature within the range 160° to 290°F. to obtain a dried intermediate material containing urea-polysaccharide adducts and at least about 5 percent water;

c. coating said intermediate material containing urea-polysaccharide adducts with a concentrated aqueous urea-formaldehyde solution containing 60 to 90 percent total solids and about 0.5 to 6.5 moles of formaldehyde for every mol of urea;

d. pelleting and agglomerating said coated intermediate material while maintaining the temperature thereof at least about 140°F.; and e. cooling the resulting pelleted product to ambient temperature. The pelleted product thus obtained normally has a total nitrogen content of about 2–10 percent with a water-insoluble nitrogen content of about 50 to 90 percent of the total nitrogen. The nitrogen may be determined to be either soluble or insoluble by AOAC tests (*AOAC Official Methods of Analyses*, Eleventh Edition, 1970, page 18).

In terms of ruminant nutrients, the pelleted product preferably contains about 25–60 percent protein equivalent. The protein equivalent of the product may be controlled by adjusting the proportion of the amide solution admixed with the solid carbohydrate material.

Suitable acid catalysts for use in the process include sulfuric acid, ammonium acid sulfate, ammonium sulfate, orthophosphoric acid, pyrophosphoric acid, superphosphoric acid and acid ammonium salts of said phosphoric acids. Preferred catalysts are superphosphoric acid and ammoniated superphosphoric acid made from wet-process phosphoric acid because these materials furnish valuable nutrient phosphate, are readily available commercially, and normally contain soluble trace minerals needed for plant and animal nutrition.

Aqueous ammoniated superphosphoric acid for use in the process of the invention can be produced by evaporating aqueous wet-process phosphoric acid to form superphosphoric acid, which is then ammoniated. Canadian Pat. No. 812,689, granted to Allied Chemical Corporation, relates to the concentration of wet-process phosphoric acid to produce superphosphoric acid, i.e., phosphoric acid containing polyphosphates.

The preferred aqueous ammoniated superphosphoric acid of this invention has a pH of from about 5 to 6, desirably about 6; a nitrogen content of from about 9 to 12 percent by weight, preferably from about 10 to 11 percent by weight; a total phosphorus content measured as $P_2O_5$ of from about 28 to 39 percent by weight, preferably about 34 to 38 percent by weight, and wherein polymeric phosphates represent from about 30 to 70 percent by weight, preferably from about 55 to 65 percent by weight, based on the weight of the total phosphorus content. The polymeric phosphates include pyrophosphates and polyphosphates.

An aqueous ammoniated superphosphoric acid (hereinafter referred to as "Solution A") was found to be particularly useful for purposes of the present invention:

| | |
|---|---|
| Nitrogen | 10.1% by weight |
| Phosphorus (as $P_2O_5$) | 34.2% by weight |
| Trace Minearls | 1 to 2% by weight |
| iron ($Fe_2O_3$) | ca. 1.0% by weight |
| calcium (CaO) | ca. 0.1% by weight |
| magnesium (MgO) | ca. 0.3% by weight |
| pH | 6.0 |
| Specific Gravity of 60°F. | 1.4 |
| Salting Out Temperature | ca. 0°F. |

Distribution as percent by weight of the ammonium phosphates of Solution A was about:
  35% ammonium orthophosphate
  51% ammonium pyrophosphate
  8% ammonium tripolyphosphate
  5% ammonium tetrapolyphosphate
  1% higher ammonium phosphates In carrying out the process according to my invention, any suitable urea-formaldehyde solution having the required concentrations of components may be used. It is advantageous, however, from a practical standpoint to utilize urea-formaldehyde solutions in which the formaldehyde component is supplied in the form of stabilized urea-formaldehyde reaction products prepared according to the teachings of United States Patent No. 2,652,377, issued Sept. 15, 1953, or United States Patent No. 3,462,256, issued Aug. 19, 1969. A preferred solution, prepared in accordance with United States Patent No. 2,652,377, contains about 10–15 percent water and about 80–85 percent urea-formaldehyde solids, the formaldehyde to urea mol ratio being between about 4.2 and 5.2.

A stable urea-formaldehyde solution (hereinafter referred to as "Solution B") having the following properties was found to be particularly useful for purposes of the present invention. Solution B is a clear, colorless, viscous, stabilized solution of formaldehyde and urea reaction products in a small amount of water. It contains about 15 percent water and approximately 85 percent solids, the latter combined in a formaldehyde to urea mol ratio of about 4.6 to 1. It is believed to contain at least part of the formaldehyde in the form of polymethyl ureas.

I have found that when the acid-catalyzed, amide-impregnated polysaccharides are dried, coated with urea-formaldehyde solution, and pelleted in accordance with the present invention, the product pellets that result have a hard, refractory appearance. It was also found that the instant process, including the catalyst addition, surprisingly improves the strength and storage properties of the product. Thus, the product can be handled with all normal material handling techniques such as belt conveying, screw conveying, trucking, and shoveling without the problems of particle degradation and formation of dust in the work area. Further, the supplemented product has the nutrients so tightly bound that "bin set" from the migration of salts to the particle surface is completely eliminated.

I have also found that the product of the invention is an improved ruminant feed composition which releases nitrogen in a slow and controlled manner in the rumen of the animal. In effect, the process of the invention combines low cost amides and water-insoluble carbohydrate materials containing polysaccharides into a valuable source of slow-release nitrogen which can be fed to ruminants with a high degree of safety. Moreover, the new product of the invention permits the use of more low-cost synthetic protein equivalent than previously has been considered practical.

While not wishing to be bound by any theory, applicant believes that the slow-release properties of the present product are achieved by chemical reaction of the amide with partially degraded, hydrolyzed polysaccharides formed under conditions of the process and by agglomeration of this combination into particles having substantial physical integrity by a polymer formed by reaction of urea and formaldehyde. Applicant further believes that said reactions of urea with polysaccharides and with formaldehyde are catalyzed by acids and salts of strong acids and weak bases, e.g., superphosphoric acid, ammoniated superphosphoric acid, ammonium sulfate, etc.

Although the pellets are hardened by treatment with the amide liquor and the dusting tendency is decreased, the pellets still retain enough porosity to allow absorption of the extra medicinal and vitamin materials which are usually used to protect animals from diseases. The hardness of the pellets surprisingly does not prevent the degradation of the pellets in the rumen so that the large surface area of the original roughage is regenerated in the rumen and benefit from the roughage content of the feed is obtained by the ruminant.

Moreover, the amide-impregnated polysaccharides on drying and reacting in accordance with the present invention, appear to provide lubrication that significantly increases pellet production rates. This improvement is particularly unexpected. While the mechanism by which the pelleting rate is increased is not known with certainty, it is suggested that the urea-formaldehyde coated, partially dried impregnated material is somewhat thermoplastic at the advanced temperatures normally used for pelleting.

DESCRIPTION OF THE PREFERRED EMBODIMENT

It is generally accepted that non-protein nitrogen such as urea is best used in conjunction with protein nitrogen for good results in ruminant feeding. However, in accordance with the present invention, the proportion of urea to natural protein can be increased if desired because a significant proportion of the urea is converted to slow-release nitrogen which is non-toxic to the ruminant.

In accordance with one preferred embodiment of this invention, an aqueous supplement containing 15 to 25 percent by weight of ammoniated superphosphoric acid (dry basis), 4 to 8 percent by weight of ammonium sulfate, 0 to 20 percent by weight of molasses or other water-soluble polysaccharides and 20 to 30 percent by weight of urea is sprayed onto a solid carbohydrate material such as alfalfa or orange pulp (containing water-insoluble polysaccharides), and the mass is mixed in suitable equipment such as a chip blender. Superphosphoric acid may be used in place of ammoniated superphosphoric acid, if desired. The mixing is carried out at a sufficiently high temperature to maintain the urea in aqueous solution during the spraying and mixing operation; a temperature in the range 50°–100°F. is normally used depending on the concentration of the supplement solution. Spraying is continued until the mass contains up to 60 percent by weight protein equivalent, on a dry weight basis. The resulting mixture is acidic, normally having a pH of 2 to 6. The damp mass is dried at a temperature of 180°–240°F. Partial hydrolysis of the polysaccharides takes place during the drying step thereby producing active carbonyl groups. A gas fired dryer is suitable equipment for the drying operation. Product temperature in the dryer should not exceed about 290°F. and is normally maintained in the range 180°–240°F. Excessive drying temperatures may char the polysaccharides. The impregnated carbohydrate material is dried within 5 to 60 minutes sufficiently to remove most of the water, i.e., it is reduced to a dry, free-flowing material containing water at a level not less than about 6 percent and not more than about 12 percent water. During the drying, a significant proportion of the urea is reacted with the partially hydrolyzed polysaccharides to form polysaccharide-urea adducts.

The thus prepared and dried impregnated carbohydrate material is sprayed with a concentrated urea-formaldehyde solution at a ratio of about 5 to 20 parts by weight of urea-formaldehyde solution per 100 parts by weight of the dried material, and the resulting mixture is agglomerated and pelleted at a temperature within the range of about 140°–300°F. to form hard homogeneous particles with high resistance to handling abrasion. Further reaction of the urea with hydrolysed polysaccharides and with the urea-formaldehyde concentrate occurs during said agglomerating pelleting operation at temperatures of say 140°–300°F. and pressures of 500–20,000 psig. While maintaining its temperature at 140°–300°F., the mixture is extruded through a die and broken into pellets. The amount of supplement in the overall formulation varies with the need for protein supplementation. Normally, sufficient supplement is added to provide a protein equivalent of 25–60 percent in the pelleted product. The pelleted mixture is preferably cooled to ambient temperature within about 1 to 60 minutes after pelleting. Reaction of residual urea with polysaccharides continues after pelleting until the product is cooled. Pelleting may be effected by any of the conventional methods employing known hard pelleting equipment and pellets of various sizes, as desired, may be formed. In general, pellets ranging in size from one-sixteenth inch diameter to 1 inch diameter are employed.

The following examples are given for the purpose of further illustrating this invention. In these examples percentages are by weight. Solution A used in these examples is aqueous ammoniated superphosphoric acid and Solution B is concentrated urea-formaldehyde solution, said solutions having the compositions described hereinabove.

EXAMPLE 1

The by-product carbohydrate material used in this example was pulp from oranges after removal of juice and drying. The composition of the orange pulp was:

| Component | Weight Percent |
| --- | --- |
| Polysaccharides | 48.1 |
| Moisture | 10.1 |
| Ash | 5.1 |
| Nitrogen | 0.4 |

These polysaccharides are of two general types: those that form the skeletal structure of the orange, i.e., fibers, which are water insoluble, and water-soluble polysaccharides including simple sugars. The polysaccharides present were primarily of the insoluble type.

About 400 parts of the dried orange pulp was blended with 10 parts of Solution A and 100 parts of aqueous urea containing 40 parts of urea. The resulting mixture was reacted and dried in a rotating reactor for 25 minutes at atmospheric pressure, with temperature of the reaction mass maintained at about 205°F. by external heating of the reactor. Samples of the reaction mixture were tested with Fehling solution and showed the presence of aldehydric carbonyl groups.

The resulting partially reacted material was then sprayed with 50 parts of Solution B, which coated the solid material. The mixture was then formed into pellets about three-eighths inch in length by three-eighths inch in diameter, and the pellets were heated in an autoclave at 240°F. for 1 hour. Pressure in the autoclave was maintained at 1,000 psig by means of nitrogen pressure. After 1 hour, the pressure was released and the pellets were cooled to ambient temperature.

Overall recovery of hard particles of slow-release nitrogen was 97 percent. Similar results were obtained when bagasse, peanut hulls, wheat straw and waste paper were substituted for the dried orange pulp.

EXAMPLE 2

This example demonstrates supplementation of orange pulp into a nutritionally acceptable feed which is suitable for use as a major part of a cattle feeding ration and the use of a supplement liquid containing suspended solids. The orange pulp was essentially the same as that used in Example 1 except that it was undried and therefore contained about 65 percent moisture. A liquid feed supplement was used to furnish the acid catalyst for the reaction as well as urea and other nutrients. Prior to use the orange pulp was passed through a chopper where it was reduced to particles of workable size.

The liquid feed supplement used was made by mixing the following ingredients:

| Ingredients | Weight Percent In Mix |
| --- | --- |
| Solution A | 30.0 |
| Ammonium Sulfate, Crystals | 10.0 |
| Aqueous Urea Liquor (65% urea) | 40.0 |
| CaCO₃ (powdered limestone) | 5.0 |
| Water (total moisture 42.0%) | 15.0 |
| | 100.0 |

Since the supplement contained some suspended solids, the supplement was stirred during storage prior to use to prevent settling of the solids. The liquid feed supplement contained 106 percent protein equivalent and was composed as follows:

| Component | Weight Percent |
| --- | --- |
| Nitrogen | 17.1 |
| Protein Equivalent | 106.0 |
| Phosphorus | 4.6 |
| Sulfur | 2.5 |
| Calcium | 2.0 |

The chopped orange pulp and the liquid feed supplement were continuously fed into a conventional blender at a rate of about 5 tons per hour or orange pulp and about 1,000 pounds per hour of liquid feed supplement with rates held as constant as possible during a two hour test period. The rate of supplement feed may be varied if required to maintain a protein equivalent of say 25–30 percent or more in the final product.

The moist impregnated orange pulp formed in the blender was fed to a conventional continuous rotary, gas fired dryer (which is also a reactor). Combustion gases fed to the dryer were maintained at about 2900°F. to permit efficient removal of water from the impregnated orange pulp. The dryer was suitably controlled to give a dried product having a temperature of about 180°F. This intermediate product contained about 8 percent water. Retention time in the dryer was about 18 minutes.

After discharge from the dryer, the dried material was sprayed with Solution B at the rate of 100 pounds of Solution B per ton of orange pulp fed to the process. This was sufficient Solution B to completely coat the dried material.

The resulting coated material was fed at 170°F. to a pellet mill, which was a conventional Sprout-Waldron pellet machine fitted with a three-eighths-inch die. The pelleted, supplemented feed was collected in the product hopper.

Recovery of protein equivalent through the process was 95 percent. The pellets, thus produced, were hard and not subject to dusting or fracture during normal handling. The surface was able to hold a soybean oil additive containing aureomycin and other medicinals applied at a 1 percent level without becoming sticky or difficult to handle. The 1 percent medicinal soybean oil application was made by spraying directly onto the pellets.

The product pellets contained 55 percent of the total nitrogen in the form of water-insoluble, slow-release nitrogen and therefore could be fed to ruminants with a high degree of safety. Moreover, the pellets were palatable to ruminants when fed on a free choice basis.

EXAMPLE 3

This example demonstrates that it is not necessary to utilize substantially pure urea as a source of amide nitrogen in the present invention. For this test, a mixed amide source was prepared by partial pyrolysis of urea to form biuret in accordance with known procedures, followed by addition of water and attapulgite clay to the pyrolyzate. Composition of the resulting mixture, which for convenience will be called "liquid amide source", was as follows:

| Component | Weight Percent |
| --- | --- |
| Biuret | 19.1 |
| Urea | 43.4 |
| Clay | 2.0 |
| Water | 34.5 |
| Triuret | 0.2 |
| Cyanuric Acid | 0.8 |
| Total Nitrogen 27.85% (wt.) | |
| Protein Equivalent 174% (wt.) | |

Orange pulp used in this example was the same as that used in Example 2. Processing was somewhat similar to Example 2 but involved additional heating as described below, to increase the water-insoluble nitrogen content of the product.

When the moist orange pulp arrived at the conversion plant it was shredded into small pieces so that sufficient surface would be available for rapid reaction with the amides. The orange pulp was then continuously transmitted to the blender where the liquid amide source, superphosphoric acid and the pulp were blended to form a homogeneous mixture which was acidic (pH about 2). The plant was operated for eight hours at the following feed rates: orange pulp — 2,000 lbs./hr.; liquid amide source — 45 lbs./hr.; and superphosphoric acid — 4.5 lbs./hr. Analysis of the superphosphoric acid catalyst was as follows:

| Component | Weight Percent |
| --- | --- |
| $P_2O_5$ | 73.0 |
| Percent of total $P_2O_5$ as Polyphosphate | 71.7 |
| F | 0.13 |
| $Fe_2O_3$ | 1.15 |
| $Al_2O_3$ | 0.81 |
| MgO | 0.20 |
| $SO_4$ | 2.75 |

The blended reactants were fed by means of a screw feeder into the continuous, direct gas fired rotary dryer (which is also a reactor) operating at essentially atmospheric pressure. The dryer-reactor was operated to allow entrance of reactants in one end and discharge from the other with back mixing minimized so that careful control was maintained over the amount of water removal. Enough moisture was maintained throughout the dryer to allow hydrolysis-degradation of the polysaccharides without charring the product. Discharge temperature of the solids was maintained at 190°F. and moisture content of the reacted material was maintained at 8 percent. The remaining moisture, which had entered with the feed materials, was continuously discharged with the combustion gases. Samples withdrawn from the dryer solids stream reduced Fehling's solution indicating presence of aldehydic groups.

The partially reacted and free-flowing intermediate product was continuously discharged from the rotary dryer. This intermediate product contained partially reacted urea and polysaccharides and had a dry appearance and low density with a high surface area.

Solution B was continuously sprayed onto the dried material at 140°F. at a rate of 50 pounds per hour, and the resulting mixture was charged to the pellet mill where small portions of the mixture were nearly instantaneously compressed to 5,000 psig, and the temperature increased to 215°F. The product was immediately discharged from pressure zone of the mill to an insulated operating at atmospheric pressure. In this zone the urea-formaldehyde polymer formation and the reaction between the partially degraded saccharides and amides was allowed to continue adiabatically and the temperature increased to 250°F. in 15 minutes retention time. The agglomerated particles, about three-eighths-inch in diameter and one-half-inch long, were then cooled. The cooled agglomerate had a hard homogeneous surface and good particle strength.

Of the total nitrogen fed, about 98 percent was recovered as usable product. About 65 percent of the total nitrogen was present in water-insoluble form, as determined by A.O.A.C. procedures.

Agronomic tests showed that the product is an excellent slow-release fertilizer. The product supplies plant food over an extended period of time and released nitrogen much slower than urea or ammonium sulfate.

The product was also tested in conventional invitro artificial rumen tests using rumen fluid freshly withdrawn from a rumen-fistulated Jersey steer. In these tests, the product gave a relatively constant supply of ammonia nitrogen in amount which could be efficiently used by the animal.

EXAMPLE 4

Alfalfa fodder, urea-biuret slurry, and superphosphoric acid were mixed, reacted and dried in accordance with the procedure of Example 3. The composition of the alfalfa was:

| Component | Weight Percent |
|---|---|
| Protein | 5.65 |
| Moisture | 71.8 |
| Polysaccharides | 19.0 |
| Fat | 0.9 |
| Ash | 2.7 |

After discharge from the reactor-dryer, the finely divided intermediate product was sprayed with Solution B at the rate of 100 pounds of Solution B per ton of alfalfa fed to the process. The sprayed intermediate product was pelleted and agglomerated at 240°F. at a pressure of 5,000 psig. The superphosphoric acid catalyst, the 240°F. heat and the 5,000 psig pressure caused the urea-formaldehyde concentrate to react with the urea and biuret present in the intermediate material and form hard homogeneous pellets with high resistance to handling abrasion and swelling in water. This product contained 28 percent protein equivalent and showed slow-release nitrogen properties when tested in conventional in-vitro artificial rumen tests.

EXAMPLE 5

The following example demonstrates the efficacy of the product of the invention as a slow-release nitrogen source in water.

Uncrushed and unfragmented pellets of the product of Example 4 were weighed analytically, 15 grams, and added to 250 ml. beakers. A total of 150 ml. distilled water was added, the contents swirled gently and then left undisturbed for the period of the soak test. After the soak period, the contents were again swirled to obtain a homogeneous liquid phase and 100 ml. of liquid was removed with a pipette, drawing as little as possible of the suspended solids into the pipette. Contents of the pipette were filtered through medium porosity glass frit vacuum filter to remove any solids withdrawn. The filter was washed with several 10–15 ml. portions of cold water and all of the filtrate was transferred with rinsing to Kjeldahl flask. Nitrogen was determined on the contents of the Kjeldahl flask by the standard A.O.A.C. method. The percent N released from the sample with soaking was then calculated on the basis of original sample weight. The nitrogen release data at different time periods was as follows: 16 percent of the total nitrogen was released after 30 minutes, and 19 percent of the total nitrogen was released after 1 hour. The original sample contained about 4.5 percent total nitrogen.

I claim:

1. A process for preparing a pelleted ruminant feed, which comprises:
   a. providing a liquid ruminant feed supplement comprising 4 to 8 percent by weight of ammonium sulfate, up to 20 percent by weight of molasses, 20 to 30 percent by weight of urea, and 15 to 25 percent by weight, on a dry basis, of an aqueous ammoniated superphosphoric acid having a nitrogen content of about 9 to 12 percent by weight, a total phosphorus content measured as $P_2O_5$ of 28 to 39 percent by weight, and wherein polymeric phosphates represent about 30 to 70 percent by weight based on the total phosphorus content;
   b. admixing said liquid feed supplement with a solid carbohydrate material selected from the group consisting of alfalfa, orange pulp, bagasse, peanut hulls, and straw, said solid carbohydrate material comprising water-soluble and water-insoluble polysaccharides, a sufficient quantity of said feed supplement being provided in the admixture to cause the latter to have a total protein equivalent of 25 to 60 percent by weight on a dry basis, and provide an acid catalyst for hydrolysis of the polysaccharides to form carbonyl groups reactive to urea;
   c. drying and reacting the admixture from step b in a conventional gas fired dryer at a temperature within the range 180° to 240°F. for 5 to 60 minutes to obtain a dried, reacted, solid material containing 6 to 12 percent by weight of water;
   d. coating the dried, reacted solid material from step c with a concentrated aqueous urea-formaldehyde solution containing 60 to 90 percent total solids and 0.5 to 6.5 mols of formaldehyde for every mol of urea, at a ratio of about 5 to 20 parts by weight of said urea-formaldehyde solution per 100 parts by weight of said dried, reacted solid material;
   e. pelleting and agglomerating the coated material from step d at a temperature of 140° to 300°F. to obtain an agglomerated pelleted product; and
   f. cooling the resulting pelleted product to ambient temperature within 1 to 60 minutes after pelleting whereby a hard pelleted product is produced.

2. The process of claim 1 wherein the pellet formation temperature in step e is 200° to 300°F.

3. The process of claim 2 wherein the aqueous urea-formaldehyde solution in step d contains 80–85 percent by weight total solids and 4.2 to 5.2 mols of formaldehyde for every 1 mol of urea.

* * * * *

UNITED STATES PATENT AND TRADEMARK OFFICE
CERTIFICATE OF CORRECTION

PATENT NO. : 3,873,733
DATED : March 25, 1975
INVENTOR(S) : William Percy Moore

It is certified that error appears in the above-identified patent and that said Letters Patent are hereby corrected as shown below:

Column 8, line 68, after "insulated" insert --zone--.

Signed and sealed this 1st day of July 1975.

(SEAL)
Attest:

RUTH C. MASON
Attesting Officer

C. MARSHALL DANN
Commissioner of Patents
and Trademarks